United States Patent
Nishida et al.

(10) Patent No.: US 6,671,089 B2
(45) Date of Patent: Dec. 30, 2003

(54) OPTICAL FILTER AND ILLUMINATION OPTICAL SYSTEM PROVIDED WITH SAME

(75) Inventors: Hiroyuki Nishida, Hachioji (JP); Shingo Kashima, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/024,709

(22) Filed: Dec. 21, 2001

(65) Prior Publication Data

US 2002/0063955 A1 May 30, 2002

Related U.S. Application Data (62) Division of application No. 09/557,649, filed on Apr. 26, 2000, now Pat. No. 6,339,498.

(30) Foreign Application Priority Data

Apr. 27, 1999 (JP) ............................................ 11-119499
Jul. 2, 1999 (JP) ............................................ 11-188876

(51) Int. Cl.[7] .............................................. G02B 21/06
(52) U.S. Cl. ....................... 359/385; 359/353; 359/372
(58) Field of Search ............................... 359/353, 388, 359/389, 372, 385, 368, 634

(56) References Cited

U.S. PATENT DOCUMENTS

| | | | |
|---|---|---|---|
| 5,481,401 A | * | 1/1996 | Kita et al. ................... 359/353 |
| 5,777,784 A | | 7/1998 | Tanaka ........................ 359/388 |
| 6,337,767 B1 | * | 1/2002 | Takeuchi ..................... 359/388 |
| 6,537,211 B1 | * | 3/2003 | Wang et al. ................. 600/178 |

FOREIGN PATENT DOCUMENTS

| | | |
|---|---|---|
| JP | 64-62609 | 3/1989 |
| JP | 5-127096 | 5/1993 |
| JP | 8-313728 | 11/1996 |

* cited by examiner

Primary Examiner—Mark A. Robinson
Assistant Examiner—Lee Fineman
(74) Attorney, Agent, or Firm—Pillsbury Winthrop LLP

(57) ABSTRACT

An optical filter has a spectral transmittance characteristic plotted as a curve that is not mirror-symmetric with respect to any vertical axis upon wavelength being taken along the axis of abscissa and transmittance being taken along the axis of ordinate. The optical filter can be designed and fabricated easily and efficiently. The optical filter is used with a light source that causes self-absorption, to constitute an illumination optical system. In the illumination optical system, an image of the arc lamp is projected with a sufficiently high magnification in good aberration condition on the pupil of the objective lens, light in a wavelength region that was conventionally unused is efficiently used, and, in addition, the heat problem is solved.

1 Claim, 9 Drawing Sheets

OPTICAL FILTER AND ILLUMINATION OPTICAL SYSTEM PROVIDED WITH SAME

CROSS REFERENCE TO RELATED APPLICATIONS

This application is a divisional application of U.S. application Ser. No. 09/557,649, filed Apr. 26, 2000, now U.S. Pat. No. 6,837,498, the entire contents of which is incorporated by reference herein.

BACKGROUND OF THE INVENTION

1. Field of the Invention

This invention relates to an illumination optical system for an ultraviolet microscope apparatus which uses wavelengths in an ultraviolet region and to an optical filter for obtaining only light with desired wavelengths in the ultraviolet region, and in particular, to an illumination optical system and an optical filter for an ultraviolet microscope apparatus which uses wavelengths in a deep ultraviolet region, less than 300 nm. This invention also relates to an illumination optical system for an ultraviolet microscope apparatus which is used in combination with a conventional microscope optical apparatus for making observations with wavelengths in a visible region.

2. Description of Related Art

In keeping with the development of high-density Integrated Circuits (ICs), microminiaturization of wiring patterns is rapidly advanced, and thus there are strong and growing demands that optical microscopes used for their observations and examinations should have high resolution. As is well known, there are two techniques of obtaining high resolution in an optical microscope. One is to increase the numerical aperture of an objective lens, and the other is to shorten wavelengths used. However, since under the present situation the numerical aperture already reaches a limited value as high as 0.95, it is very difficult to desire a higher numerical aperture. Hence, the technique of reducing wavelengths must be used, but with wavelengths in the visible region, it is difficult to accommodate microminiaturization of recent ICs, and it becomes necessary to use ultraviolet rays which have wavelengths shorter than those in the visible region.

Various ultraviolet microscopes have been suggested, and examples of ultraviolet microscopes using light sources, such as mercury-vapor lamps, are set forth in Japanese Patent Preliminary Publication Nos. Sho 64-62609 and Hei 5-127096. A microscope disclosed in Sho 64-62609 is designed so that all lenses placed in optical paths of ultraviolet rays are constructed of quartz. On the other hand, a microscope disclosed in Hei 5-127096 is such that an illumination lens and an objective lens system are corrected for chromatic aberration in wavelength regions extending from a visible region to a near-ultraviolet region, and is equipped with means for observing a visible image and an ultraviolet image.

A light source used for illumination has a specialty with respect to each of the characteristics of its spectral intensity distribution and emission point. For an illumination optical system taking account of the characteristic of a special emission point of the light source itself, it is disclosed in Japanese Patent Preliminary Publication No. Hei 6-289301 that a nearly afocal, variable-magnification lens system is interposed to be removable between a lamp house containing a light source and collector lenses and a projection optical system. This variable-magnification lens system is provided for the purpose that when a halogen lamp is replaced by an arc lamp, the magnification of projection of the lamp on the pupil of an objective lens is changed. The lens system includes two lens units with two lens components, comprised of a positive lens and a negative lens which are arranged in this order from the collector lens side.

Here, a brief description of the arc lamp is given. An arc lamp, like a high-pressure mercury-vapor lamp, is adapted to cause an electric discharge between an anode and a pointed cathode so that extremely bright light is produced. In the arc lamp, a space between the anode and the cathode is narrow, and the discharge is not maintained at a uniform intensity between them. Truly high luminance is kept only in a very small region close to the pointed cathode. Thus, in Hei 6-289301, when the light source is switched to the arc lamp, the variable-magnification lens system is inserted to increase the magnification of projection of an arc on the pupil of the objective lens, thereby casting bright illumination upon the pupil of the objective lens.

Figure 1:
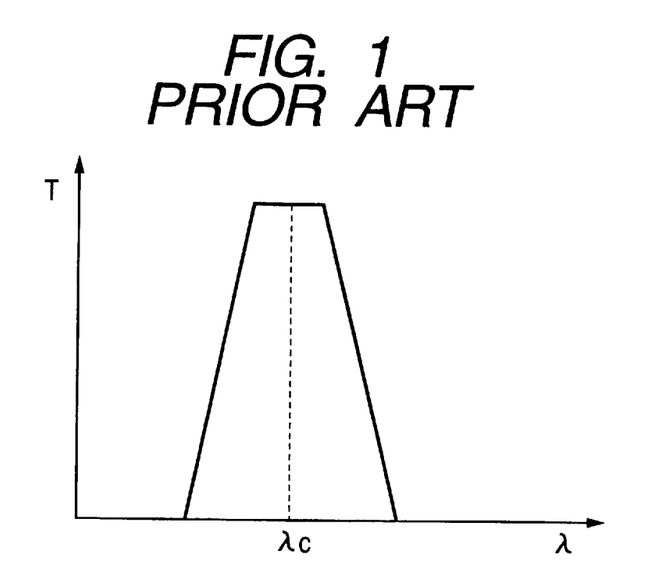
FIG. 1 is a diagram showing the spectral transmittance characteristic curve of a conventional optical filter.

In order to make observations with ultraviolet rays, it becomes necessary to use an optical filter for selecting only light in a particular wavelength region from among various wavelengths emitted from a light source. In a conventional, optical microscope used in a visible region, an optical filter (namely a band-pass filter, which is hereinafter abbreviated to BPF) placed in an illumination optical system or an observation optical system to obtain only light in a desired wavelength region, as shown in FIG. 1, is such that its spectral transmittance characteristic curve is symmetrical about a wavelength $\lambda c$ in the vicinity of the desired wavelength region. Hence, this spectral transmittance distribution is not set to take account of a special, spectral intensity distribution characteristic of the light source itself.

Another technique of obtaining light with desired wavelengths in an ultraviolet wavelength region is that, in a microscope illumination system using deep ultraviolet light from a light source such as an arc lamp, light other than desired deep ultraviolet light is transmitted through a cold mirror and only deep ultraviolet light reflected by the cold mirror is used.

For still another technique, an example of a combination of a transmission-type element and a reflection-type element is disclosed in Japanese Patent Preliminary Publication No. Hei 8-313728.

In the case where the technique disclosed in Sho 64-62609 is employed, however, lens material used is limited to quartz, and therefore correction for chromatic aberration is impossible. Thus, there is the problem that a substantially usable wavelength is restricted to a certain particular wavelength (or a very narrow wavelength region). Moreover, because chromatic aberration cannot be corrected, the resolution and contrast of an image may be degraded due to the chromatic aberration unless light with wavelengths other than this wavelength is cut off by a filter. In the illumination optical system, aberration also causes uneven illumination. Because the usable wavelength is limited to the above wavelength, only a dark image can be observed. Furthermore, this prior art publication fails to give a description of a combination with a conventional microscope for visible-region observation, and thus the possibility of this combination is unclear. Since a specific means or condition for selecting wavelengths in the ultraviolet region, shorter than 300 nm, is not described, the optimum resolution, contrast, and brightness cannot be obtained directly even if the technique is used as it is.

In contrast to this, with the technique disclosed in Hei 5-127096, chromatic aberration is corrected in the range from the visible region to the near-ultraviolet region, and hence it is possible to combine a visible-image observation with an ultraviolet-image observation. Since, however, chromatic aberration is not corrected in the region of wavelengths shorter than 300 nm, the resolution and contrast of an image in this wavelength region are considerably deteriorated and uneven illumination is produced. In addition, this publication provides a means for separating a visible image from an ultraviolet image, but fails to suggest a specific means or condition for selecting wavelengths in the ultraviolet region, less than 300 nm. Therefore, the optimum resolution, contrast, and brightness cannot be obtained directly even if the technique is used as it is.

The technique disclosed in Hei 8-313728 is provided for use in semiconductor exposure so that the transmittance of a wavelength used is increased and those of the other wavelengths are decreased. However, since the technique is not directed to photography and observation for which a TV camera is used, this publication does not in any way suggest to what extent the transmittances of the other wavelengths must be held or a consideration for the transmittances of wavelengths in the infrared region. Moreover, an illumination optical system and an imaging optical system are not specifically described.

Where the ultraviolet rays are employed, a TV camera must be used for observation and examination, but a resulting image is black and white and does not contain color information. However, an actual examination may be made on color information for which light in the visible region is used, and hence it is desired to carry out both the ultraviolet-region observation in which high resolution is obtained and the visible-region observation in which color information is derived. Each of the above prior art publications, however, fails utterly to specifically prove the possibility of such a technique.

On the other hand, for the optical filter, the BPF is such that as the slopes of the ascent and descent of its transmittance characteristic curve are steepened, its design and fabrication become difficult. In general, the BPF is multilayer-coated with interference films having a short-wavelength cutoff characteristic and a long-wavelength cutoff characteristic (both cutoff characteristics are almost the same), thereby exhibiting desired characteristics. However, if an attempt is made to steepen the slopes, the kind of film will be increased and the whole number of coating films will also be increased. Consequently, the design of the BPF becomes very difficult. Furthermore, when the BPF is fabricated, its respective film thicknesses must be rigidly controlled because of an increase of the whole number of coating films. Thus, there is the problem that a failure to control the film thickness in any layer causes deterioration in design performance and makes its fabrication very difficult. Since, in an ordinary lamp, light is radiated over a wide wavelength region, the BPF selecting only light in a desired wavelength region therefrom requires that the slopes of the ascent and descent of its transmittance characteristic curve are steepened in the same way on both the short-wavelength side and the long-wavelength side. In this way, the above problem arises on each of the short-wavelength side and the long-wavelength side.

The variable-magnification lens system placed at the middle of the illumination optical system which is disclosed in Hei 6-289301 can be designed to include two lens units with two lens components, comprised of a positive lens and a negative lens, because various glass materials with different refractive indices and dispersion properties can be used for lenses in an illumination optical system using visible light. However, in the region of wavelengths shorter than 300 nm, materials used for lenses, from the viewpoint of transmittance, are limited to two kinds: fluorite and quartz. With this construction, aberrations including chromatic aberration cannot be corrected.

In the construction that only desired ultraviolet light is substantially used, there is the problem that light in the region of other wavelengths becomes flare or ghost, which adversely affects observations.

SUMMARY OF THE INVENTION

It is, therefore, a primary object of the present invention to provide an ultraviolet microscope optical system which, when using a light source emitting light over a wide wavelength range from ultraviolet light to infrared light, is capable of observing an image that is bright and high in resolution and contrast and can be favorably used in combination with the optical system of a conventional microscope for visible-region observation, and which chiefly uses wavelengths in a deep ultraviolet region, shorter than 300 nm.

It is another object of the present invention to provide an optical filter which is easy in design and fabrication and has high efficiency, taking account of characteristics of a light source.

It is still another object of the present invention to provide a reflecting illumination optical system which is favorably corrected for aberrations and projects an arc lamp on the pupil of an objective lens at a sufficient projection magnification.

It is a further object of the present invention to provide a reflecting illumination optical system which is optimized to take advantage of light in a wavelength region which never has been used before.

In order to achieve the above objects, according to one aspect of the present invention, the ultraviolet microscope optical system is constructed so that light in the region of wavelengths shorter than 300 nm, emitted from a light source, irradiates a specimen through an illumination optical system, a path connecting means, and an objective lens system, and the light reflected by the specimen is imaged through the objective lens system, the path connecting means, and an imaging optical system, a resulting image being photographed by a photographing means. A wavelength selective means is placed in the microscope optical system, and the illumination optical system and the objective lens system, as well as the path connecting means and the imaging optical system, are corrected for chromatic aberration in the range of wavelengths selected by the wavelength selective means. When a transmittance at the center of a selected wavelength region is represented by To, a half width at full maximum is represented by $\delta$(nm), an average transmittance in the region of wavelengths longer than 300 nm is represented by Tm, and a sensitive wavelength region of the photographing means in the region of wavelengths longer than 300 nm is represented by $\Delta$(nm), the wavelength selective means satisfies the following condition:

$$(To \cdot \delta)/(Tm \cdot \Delta) > 2$$

According to another aspect of the present invention, the ultraviolet microscope optical system includes a first microscope optical system in which light emitted from a first light source irradiates a specimen through a first illumination optical system and a first objective lens system so that the light reflected by the specimen can be observed through the first objective lens system, a first imaging lens system, and an observation optical system, and a first wavelength selective means is interposed between the first objective lens system and the first imaging lens system to reflect light with wavelengths shorter than 300 nm and transmit light with wavelengths ranging at least 400 nm to 700 nm. The ultraviolet microscope optical system further includes a second microscope optical system in which light in the region of wavelengths shorter than 300 nm, emitted from a second light source, irradiates the specimen through a second illumination optical system, a path connecting means, the first wavelength selective means, and a second objective lens system, and the light reflected by the specimen is imaged through the second objective lens system, the path connecting means, and a second imaging optical system, a resulting image being photographed by a photographing means. A second wavelength selective means is interposed between the second light source and the path connecting means, and the second illumination optical system and the second objective lens system, as well as the path connecting means and the second imaging optical system, are corrected for chromatic aberration in the range of wavelengths selected by the second wavelength selective means. When a transmittance at the center of a selected wavelength region is represented by To, a half width at full maximum is represented by $\delta$(nm), an average transmittance in the region of wavelengths longer than 300 nm is represented by Tm, and a sensitive wavelength region of the photographing means in the region of wavelengths longer than 300 nm is represented by $\Delta$(nm), the second wavelength selective means satisfies the following condition:

$$(To \cdot \delta)/(Tm \cdot \Delta) > 2$$

A unit including the first light source and the first objective lens system or a unit including the second light source and the second objective lens system is selectively used, and thereby a visible image or an ultraviolet image can be selectively observed.

The optical filter according to the present invention is constructed so that its spectral transmittance characteristic curve is asymmetrical when wavelengths are plotted along the abscissas against transmittances along the ordinates.

The reflecting illumination optical system of the present invention includes a combination of a light source causing self-absorption and an optical filter whose spectral transmittance characteristic curve is asymmetrical when wavelengths are plotted along the abscissas against transmittances along the ordinates.

The reflecting illumination optical system of the present invention is provided with a light source, a collector lens for practically collimating a light beam emitted from the light source, a dichroic mirror for reflecting desired deep ultraviolet light from a practically collimated beam and transmitting light extending from the near-ultraviolet region to the near-infrared region, a first illumination optical system which uses a light beam reflected by the dichroic mirror to make observations through an objective lens for deep ultraviolet light, and a second illumination optical system which uses a light beam transmitted through the dichroic mirror to make observations through an objective lens for visible light.

These and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

In the present invention, it is desirable that the wavelength selective means is interposed between the light source and the illumination optical system and the photographing means is a TV camera. When the microscope optical system is constructed so that the illumination optical system and the objective lens system, as well as the path connecting means and the relay optical system, are corrected for chromatic aberration in the region of wavelengths selected by the wavelength selective means, which satisfies a condition to be described later, an image that is bright and has high resolution and contrast can be displayed on a TV screen.

As is generally known, when light in a wavelength region other than that in which chromatic aberration is corrected reaches the TV camera, an image of inferior quality due to aberration of the optical system is superimposed on an image plane. This causes considerable deterioration in contrast of the image as in the case of a noise component such as flare. It is, therefore, desirable that light in a wavelength region in which chromatic aberration is not corrected is cut off as far as possible. In this case, however, the wavelength region of light which must be cut off is much wider than that in which chromatic aberration is corrected, and thus it is necessary to take account of the width of wavelength and the transmittance. Specifically, if the width of wavelength becomes large, the transmittance must be lowered accordingly to reduce the total amount of light.

Thus, when an average transmittance in the region of wavelengths longer than 300 nm is denoted by Tm and a sensitive wavelength region of the TV camera in the region of wavelengths longer than 300 nm is denoted by Δ(nm), a noise component is expressed as Tm·Δ. Further, when a transmittance at the center of a selected wavelength region is designated by To and a half width at full maximum is designated by δ(nm), an observation image component is expressed as To·δ. In this way, it becomes possible to make observations with good contrast when the wavelength selective means satisfies the following condition:

$$(To \cdot \delta)/(Tm \cdot \Delta) > 2 \qquad (1)$$

If the value of (To·δ)/(Tm·Δ) is 2 or smaller, the resolution and contrast of the image will be degraded due to chromatic aberration.

In the present invention, the wavelength selective means is constructed with at least one transmission-type element and at least two reflection-type elements whose reflecting surfaces are placed parallel to each other. When at least one of these reflection-type elements is designed so that light is reflected a plurality of times, a favorable result is obtained. Since the illumination optical system and the objective lens system, as well as the path connecting means and the relay optical system, are corrected for chromatic aberration in the wavelength region selected by the wavelength selective means, the microscope optical system of the present invention, in contrast with an optical system where aberration is corrected in terms of only one wavelength, is capable of making observations with the width of wavelength of some extent. Bright observations are thus carried out. In this way, when the wavelength selective means is constructed with at least one transmission-type element and at least two reflection-type elements, the transmittance at the center of the selected wavelength region can be improved. The reason for this is as follows:

When a wavelength selection is made by a single transmission-type element as in a conventional band-pass filter, there is the need to cut off all the wavelengths other than selected wavelengths in order to ensure image quality in practical use. However, the sensitivity of the TV camera extends from the visible region to the infrared region. Hence, if an attempt is made to cut off wavelengths in such regions as well, the transmittance of ultraviolet light at the center of the selected wavelength region will be impaired and it becomes difficult to obtain brightness. This is because a single element must be caused to bear all characteristics in a wide wavelength region extending from ultraviolet light to infrared light.

A reflection-type element, in contrast with a transmission-type element, is hard to exhibit the characteristic of the wavelength selection, but has the feature that light on the long-wavelength side can be cut off with comparative ease. For the reflection-type element, however, unwanted light cannot be completely cut off with a single element. In order to completely cut off unwanted light, it is necessary to combine a plurality of elements. Thus, at least two reflection-type elements are used to thereby cut off wavelengths extending from the ultraviolet region to the infrared region so that a burden to the transmission-type element is lightened, and then the wavelength selection is exercised by at least one transmission-type element. By doing so, the transmittance at the center of the selected wavelength region can be improved, and as a result, favorable brightness can be ensured.

In this case, however, if a considerable number of reflection-type elements are used, for example, the adjustment of the optical axis becomes very difficult. It is thus desirable that at least one of a plurality of reflection-type elements whose reflecting surfaces are arranged parallel to one another is constructed so that light can be reflected a plurality of times. In this configuration, the accuracy of assembly is easily obtained because when a part to which the reflection-type elements are attached is fabricated, it is only necessary to place the elements so that their reflecting surfaces become parallel. In addition, the number of reflection-type elements can be reduced, and hence a distance between the elements is easily adjusted.

In the present invention, the illumination optical system is constructed with a collector optical system placed, together with a light source, in a light source device and an illumination relay optical system so that the light source is placed close to the object focal point of the collector optical system. In this case, the illumination optical system becomes more effective when the relation between a distance D from a light source mounting position to a lens, situated closest to the light source side, of the illumination relay optical system and a beam diameter φ of light incident on the lens satisfies the following condition:

$$D/\phi \geq 4 \qquad (2)$$

Specifically, the light source is placed close to the object focal point of the collector lector optical system and thereby a light beam between the collector optical system and the illumination relay optical system can be rendered nearly parallel. This arrangement makes it hard to undergo the influence of the angular characteristic of an interference filter placed in the optical path. Furthermore, owing to this nearly parallel beam, the distance D can be arbitrarily set to some extent, corresponding to the number and sizes of optical elements placed there. In particular, where the wavelength selective means constructed as mentioned above is placed, a light beam emerging from the collector optical system will be blocked unless the distance between the reflecting surfaces is increased to some extent. However, when the illumination optical system is designed as described above, a favorable arrangement can be made and thus the light beam is not blocked.

The wavelength selective means so far discussed is designed to perform at least three reflections: at least one for one reflecting surface and at least two for the other reflecting surface. Therefore, there is the need to hold a distance at least three times the beam diameter. Moreover, the transmission-type element is also placed and thus when a space for this element is considered, a distance nearly four times the beam diameter must be held as the minimum limit. Condition (2) is defined, taking account of the above description, and if the value of D/φ is below 4, it becomes difficult to place the wavelength selective means of the above construction.

Furthermore, in the present invention, it is desirable that the materials of lenses constituting the illumination optical system are fluorite and quartz and at least one of lenses with positive focal lengths is constructed of fluorite. In order to correct chromatic aberration from which the optical system suffers, it is necessary to combine at least two kinds of materials, but materials favorably transmitting light with wavelengths shorter than 300 nm are substantially limited to fluorite and quartz. When fluorite, which has a smaller wavelength dispersion than quartz, is used for a lens with positive focal length, the production of chromatic aberration can be effectively suppressed. However, since fluorite is a soft material and is unfavorable for workability, it is desirable that the number of lenses constructed of fluorite is kept to a minimum in practical use.

The present invention also pertains to a microscope optical system in which the optical system of a microscope for ultraviolet-region observation is combined with the optical system of a conventional microscope for visible-region observation so that both the ultraviolet-region observation and the visible-region observation are carried out. Most of the description of the optical system of the microscope for ultraviolet-region observation is the same as the above description, from which the following explanation is quoted. For the optical system of the microscope for visible-region observation, there is no need to give a specific description in particular, and thus only how these optical systems are connected will be explained.

In the present invention, besides the above wavelength selective means, an additional wavelength selective means is interposed between an objective lens system and an imaging lens system in the optical system of the conventional microscope for visible-region observation. The latter wavelength selective means is designed to reflect light with wavelengths shorter than 300 nm and transmit light with wavelengths extending from at least 400 nm to 700 nm. The objective lens and the light source are selectively placed, and thereby light in the ultraviolet region reflected by this wavelength selective means can be observed through a display means, such as a TV, mentioned above. On the other hand, light in the visible region transmitted through the wavelength selective means can be observed through a conventional observation optical system for visible light.

Figure 2:
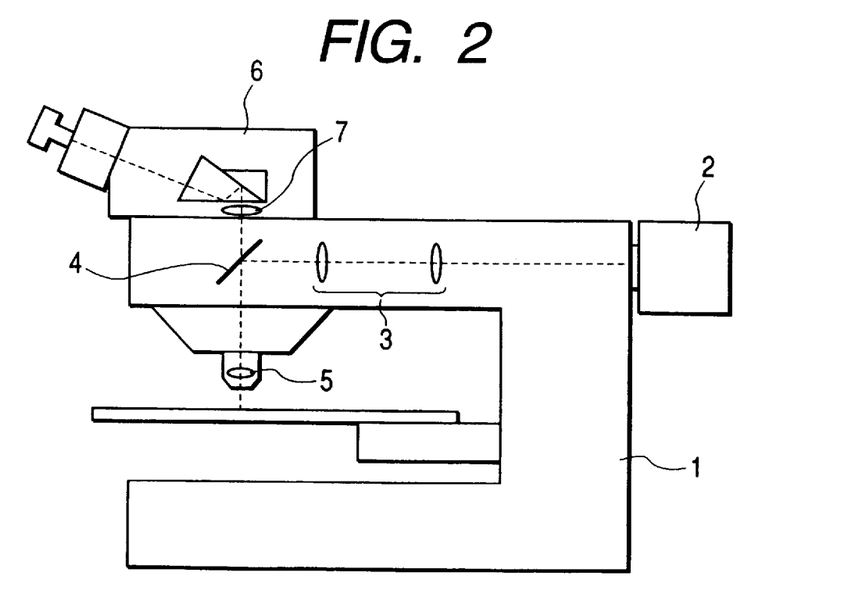
FIG. 2 is a view showing the construction of an ordinary microscope for visible-region observation.

Before undertaking the description of the first embodiment, it will be expedient to explain a general construction of the conventional microscope for visible-region observation in reference to FIG. 2. In a microscope body 1, a visible light source device 2 provided with a visible light source is mounted so that light emitted from the visible light source, after passing through a visible illumination relay optical system 3, is reflected by a half mirror 4 and illuminates a specimen through an objective lens 5. An observation optical system unit 6 can be removed from the microscope body 1, and an observation optical system including an imaging lens 7 is placed therein. The light reflected from the specimen passes through the objective lens 5 and is transmitted through the half mirror 4. After that, the light is introduced into the observation optical system unit 6 so that it can be observed with the eye.

First Embodiment

Figure 3:
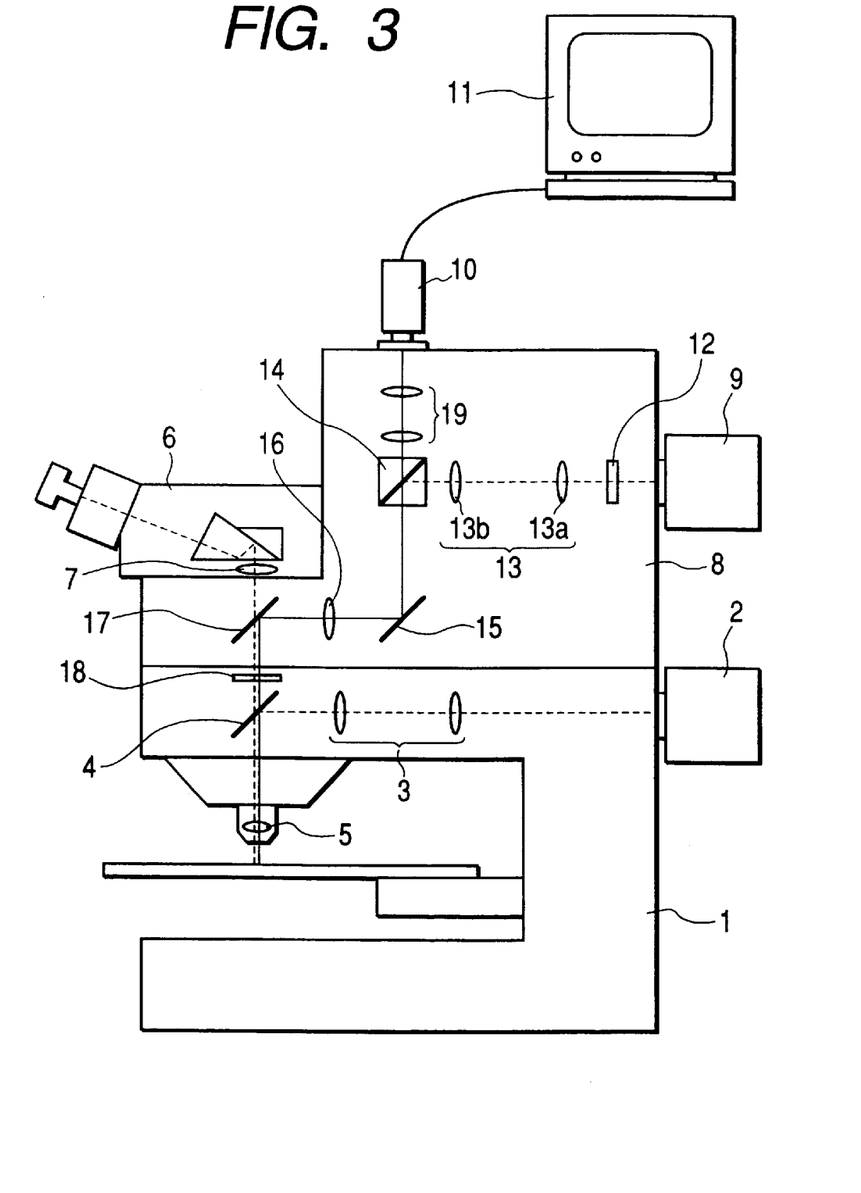
FIG. 3 is a view showing the construction of an ultraviolet microscope of a first embodiment in the present invention.

This embodiment, as shown in FIG. 3, is constructed so that an ultraviolet microscope unit 8 is placed between the microscope body 1 and the observation optical system unit 6 in the conventional microscope for visible-region observation. The ultraviolet microscope unit 8 can be easily attached to the conventional microscope for visible-region observation, and thereby both the visible-region observation and the ultraviolet-region observation can be carried out with a single microscope unit. Thus, like numerals are used for like parts with respect to FIG. 2, and the description of these parts is omitted. Also, as is well known, where the ultraviolet-region observation is made, the objective lens 5 must be exchanged, but in the following description of the ultraviolet-region observation, the same numeral 5 is also used conveniently for an exchanged objective lens.

An ultraviolet light source device 9 is attached to the ultraviolet microscope unit 8, and includes a mercury-vapor lamp and a collector lens unit. A TV camera 10 as a photographing means is also attached thereto so that a photographed specimen image can be observed through a display means 11. Light emitted from the mercury-vapor lamp is such that only ultraviolet light used is selected by a wavelength selective means 12 and illuminates the specimen through an ultraviolet illumination relay optical system 13, a path connecting means 14, a mirror 15, an ultraviolet imaging lens 16, a wavelength selective means 17, a quarter-wave plate 18, the half mirror 4, and the objective lens 5.

The light reflected by the specimen is imaged through the objective lens 5, the half mirror 4, the quarter-wave plate 18, the wavelength selective means 17, the ultraviolet imaging lens 16, the mirror 15, the path connecting means 14, and an ultraviolet relay optical system 19, and a resulting image is photographed by the TV camera 10. When the objective lens 5 is used for visible light, the visible light source device 2 is used to make observations with the eye along a dotted optical path, while when it is for ultraviolet light, the image is observed through the display means 11 along a solid optical path. In the first embodiment, a deflection beam splitter is used as the path connecting means 14 and therefore the quarter-wave plate 18 is placed in the optical path. This arrangement brings about brightness nearly twice that in the case where a half prism is used. It is desirable that the quarter-wave plate 18 is placed inside the ultraviolet microscope unit 8, but even when it is placed in the microscope body 1 as in the first embodiment, there is no problem of impairing the function of the quarter-wave plate 18.

Figure 4A:
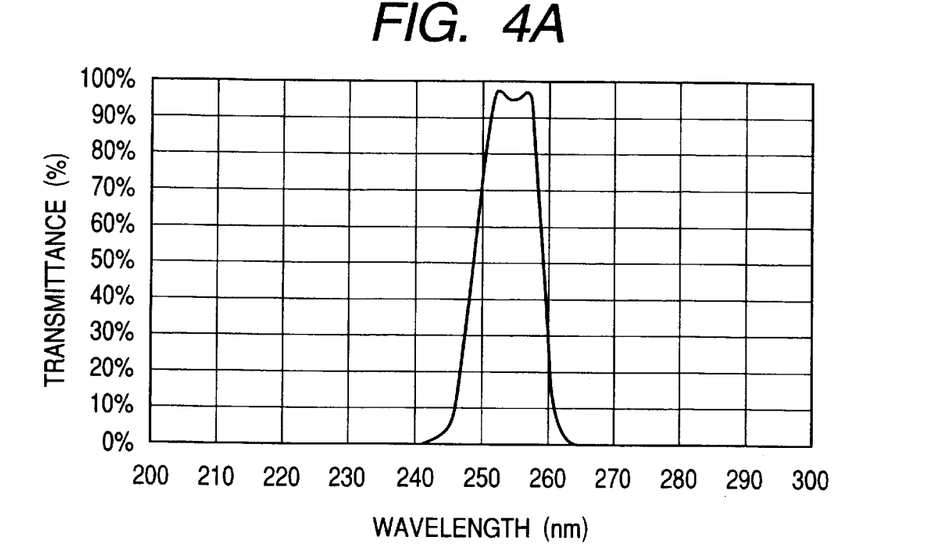
FIGS. 4A and 4B are graphs showing transmittance characteristic curves of one wavelength selective means in FIG. 3.
Figure 4B:
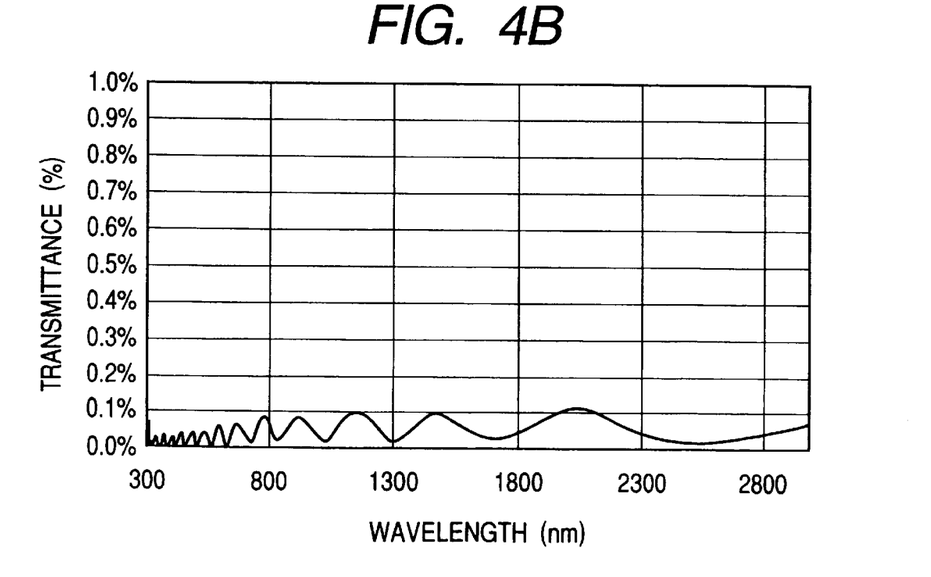
Figure 5:
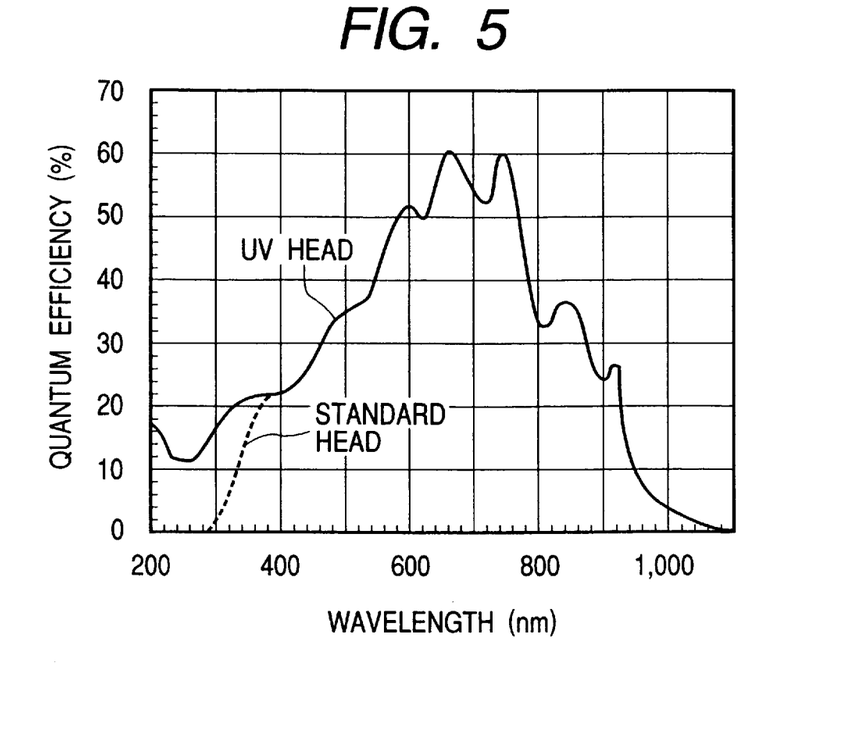
FIG. 5 is a graph showing the spectral sensitivity characteristic curve of a TV camera in FIG. 3.

The wavelength selective means 12 has transmittance characteristics such as those shown in FIGS. 4A and 4B. The transmittance To at the center of the selected wavelength region, as plotted in FIG. 4A, is approximately 95%. However, actually, there is some absorption by a film material, and thus the transmittance To may safely be thought of as about 70%. The half width at full maximum $\delta$ is 10 nm, and the average transmittance Tm in the region of wavelengths longer than 300 nm, as shown in FIG. 4B, is nearly 0.1%. The spectral sensitivity characteristic curve of the TV camera 10, as shown in FIG. 5, is found to extend to a wavelength of about 1100 nm. Hence, the sensible wavelength region $\Delta$ of the TV camera 10 in the region of wavelengths longer than 300 nm becomes 800 nm. Substitution of these values in Condition (1) gives $$(70 \times 10)/(0.1 \times 800) = 8.75 > 2$$

and observations can be carried out with highly good contrast.

Figure 6:
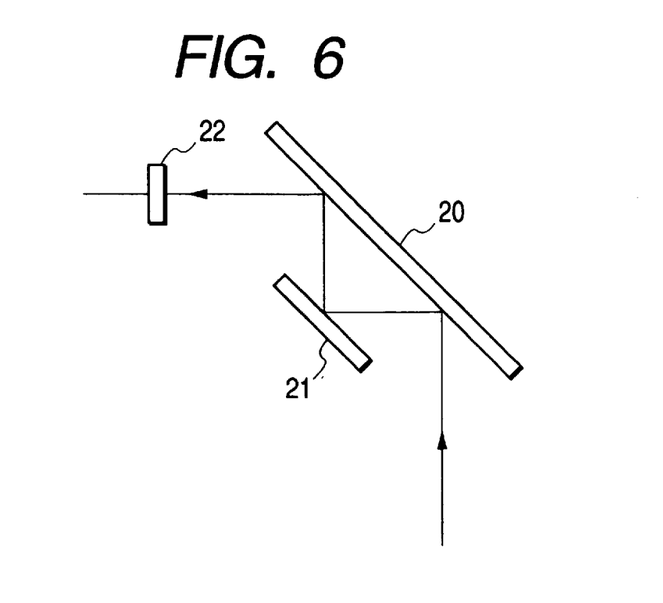
FIG. 6 is a view showing one example of a wavelength selective means.
Figure 7:
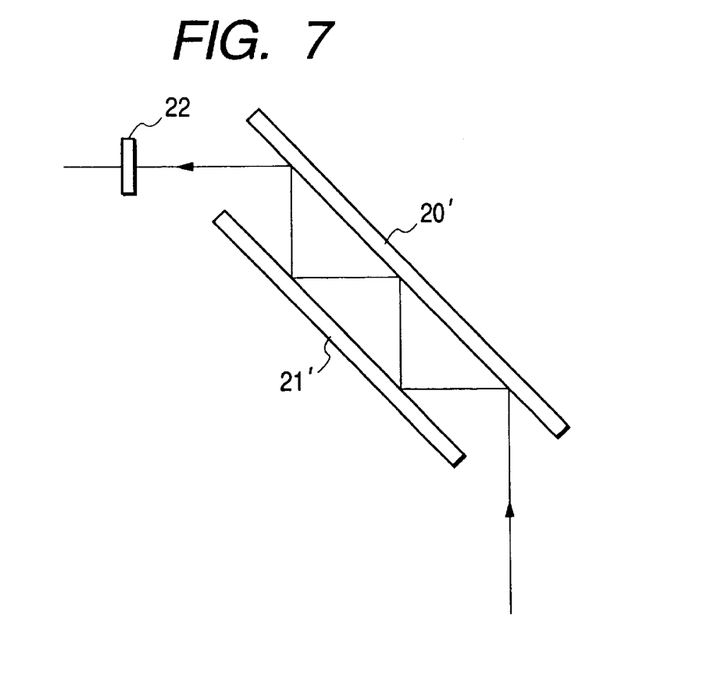
FIG. 7 is a view showing another example of the wavelength selective means.
Figure 8:
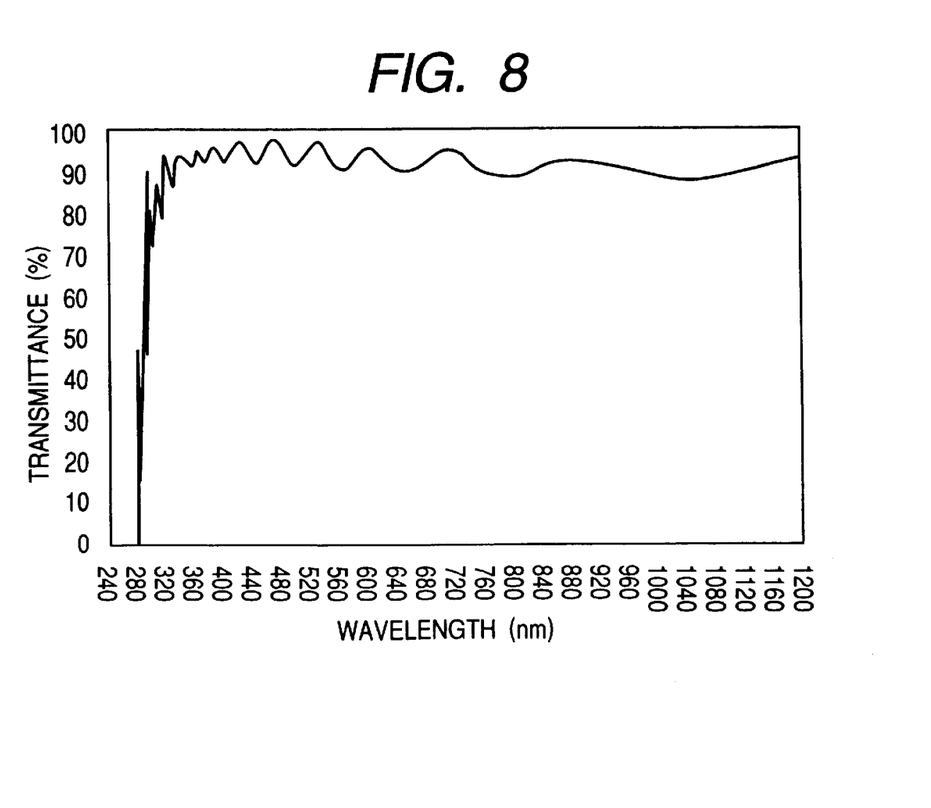
FIG. 8 is a graph showing the transmittance characteristic curve of an additional wavelength selective means.

A specific configuration of the wavelength selective means 12 used in the first embodiment is illustrated in FIG. 6. In this case, two reflection-type elements 20 and 21 are arranged so that their reflecting surfaces are parallel, and a light beam, after being reflected twice by the reflection-type element 20 and once by the reflection-type element 21 between them, is transmitted through a transmission-type element 22. However, the wavelength selective means 12, as shown in FIG. 7, may be constructed so that the light beam is reflected three times by a reflection-type element 20' and twice by a reflection-type element 21'. On the other hand, the additional wavelength selective means 17, as shown in FIG. 8, has transmittance characteristics of reflecting light with wavelengths shorter than 300 nm and transmitting light with wavelengths extending from 400 nm to 700 nm. Thus, the microscope of the first embodiment is constructed so that both the ultraviolet-region observation and the visible-region observation can be carried out.

Figure 9:
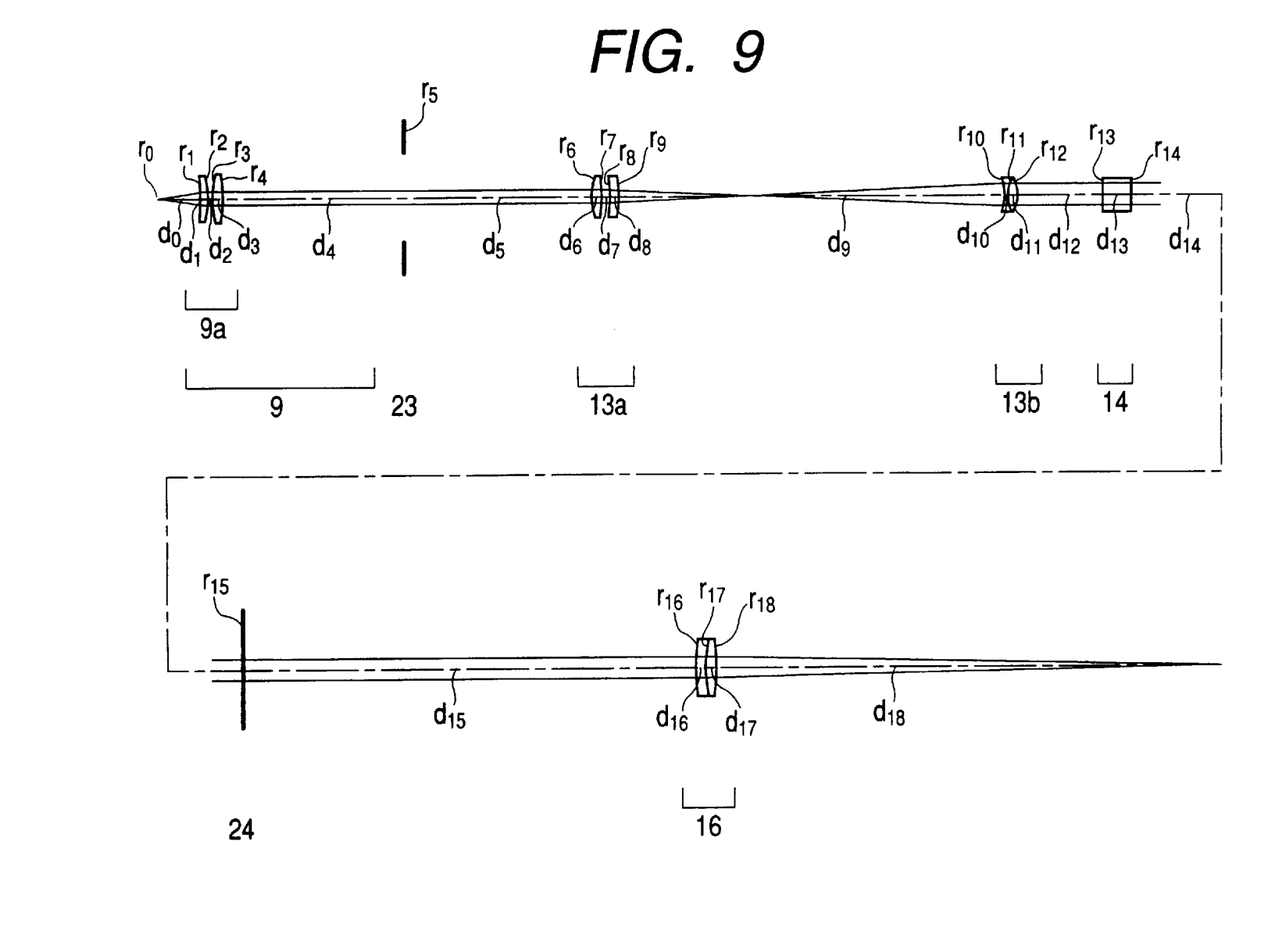
FIG. 9 is a view for explaining the arrangement of an illumination optical system in the first embodiment.

FIG. 9 illustrates the arrangement of the illumination optical system in the first embodiment. In this case, a collector lens unit 9a is disposed inside the ultraviolet light source device 9. When a collector optical system is assumed to range from the collector lens unit 9a to a mounting portion 23 relative to the ultraviolet microscope unit 8, the distance D from the mounting portion 23 to a lens unit 13a, placed closest to the light source side, of the ultraviolet illumination relay optical system 13 is 70 mm, and the beam diameter $\phi$ of light incident on the lens unit 13a is 12 mm. When these value are substituted in Condition (2), the result is 5.83, which is larger than 4. Also, reference numeral 24 in FIG. 9 designates the image plane of the specimen.

Numerical data of the optical system shown in FIG. 9 are listed below. As will be seen from the data, the material of each of positive lenses of lens units 13a and 13b constituting the ultraviolet illumination relay optical system 13 is fluorite.

| Surface No. | Radius of curvature r (mm) | Surface-to-surface distance d (mm) | Material |
| --- | --- | --- | --- |
| 0 |  | 16.5 |  |
| 1 | −46.9489 | 2.0 | Quartz |
| 2 | −13.4361 | 1.0 |  |
| 3 | 53.0428 | 2.5 | Quartz |
| 4 | −30.0294 | 71.5 |  |
| 5 | ∞ | 70.0 |  |
| 6 | 24.2628 | 3.5 | Fluorite |
| 7 | −56.7007 | 3.85 |  |
| 8 | −29.0452 | 2.5 | Quartz |
| 9 | −499.4109 | 147.3177 |  |
| 10 | −19.7665 | 1.25 | Quartz |
| 11 | 7.9280 | 5.45 | Fluorite |
| 12 | −13.2213 | 33.0 |  |
| 13 | ∞ | 10.0 | Quartz |
| 14 | ∞ | 12.0 |  |
| 15 | ∞ | 174.4749 |  |
| (Specimen image plane) | | | |
| 16 | 826.6658 | 3.0 | Quartz |
| 17 | 33.9959 | 5.0 | Fluorite |
| 18 | −76.3841 | 198.4119 |  |

The first embodiment may be designed to eliminate the observation optical system unit 6 and replace the wavelength selective means 17 with a mirror.

Before undertaking the description of the second to sixth embodiments, the optical filter of the present invention and the microscope optical system using this filter will be generally explained.

The optical filter of the present invention is characterized in that its spectral transmittance characteristic curve is asymmetrical when wavelengths are plotted along the abscissas against transmittances along the ordinates. In this way, a rapid change in transmittance attended with difficulties in design and fabrication can be held on only one side of the curve.

A change of the transmittance of the spectral transmittance characteristic curve is relatively rapid on the short-wavelength side and moderate on the long-wavelength side. Consequently, the rapid change of transmittance attended with difficulties in design and fabrication can be held on only the short-wavelength side.

A wavelength slope width from the peak of the transmittance characteristic curve on the long-wavelength side to the bottom thereof is at least 1.5 times that on the short-wavelength side. Consequently, the rapid change of transmittance attended with difficulties in design and fabrication can be held on only the short-wavelength side.

An extra-high pressure mercury-vapor lamp or an extra-high pressure mercury-vapor xenon lamp is used as a light source, and the optical filter is adapted to select only light in the region of wavelengths of approximately 250 nm from light emitted from the light source. Its spectral transmittance characteristic curve rises from the bottom toward the peak over a wavelength slope width of 10 nm on the short-wavelength side, and falls from the peak toward the bottom over a wavelength slope width of 20 nm on the long-wavelength side. Consequently, the rapid change of transmittance attended with difficulties in design and fabrication can be held on only the short-wavelength side.

The reflecting illumination optical system of the present invention includes a combination of a light source causing self-absorption and an optical filter whose spectral transmittance characteristic curve is asymmetrical when wavelengths are plotted along the abscissas against transmittances along the ordinates. Thus, an illumination optical system in which a filter fabricated with little difficulty is optimized to take advantage of light emitted from the light source can be constructed.

The reflecting illumination optical system of the present invention includes a combination of a light source causing self-absorption and the optical filter mentioned above. In this way, an illumination optical system in which a filter fabricated with little difficulty is optimized to take advantage of light emitted from the light source can be constructed.

The illumination optical system is characterized by using wavelengths of 280 nm or shorter, and thereby a desired wavelength region can be used as a deep ultraviolet region in which the amount of light is small and special difficulties of design and fabrication of the BPF are involved. The use of wavelengths of 280 nm or shorter, derived from the extra-high pressure mercury-vapor lamp, is more effective. Similarly, the use of wavelengths of 280 nm or shorter, derived from the extra-high pressure mercury-vapor xenon lamp, is also more effective.

When the light source is the extra-high pressure mercury-vapor lamp or the extra-high pressure mercury-vapor xenon lamp and a desired wavelength is about 250 nm, the spectral transmittance characteristic curve of an optical filter for deriving only light in a desired wavelength region shows an asymmetry that it is considered that light with a wavelength of 254 nm which is the bright-line spectrum of mercury does not radiate due to the self-absorption. Thus, light of the desired wavelength can be obtained more effectively.

The illumination optical system is also a microscope reflecting illumination optical system which uses an arc lamp as a light source and has a collector lens for practically collimating a light beam from the light source and a projection optical system for projecting the image of the light source on or close to the pupil of an objective lens. In this illumination optical system, a nearly afocal lens system including, in order from the collector lens side, a lens unit with positive power, a lens unit with negative power, and a lens unit with negative power and an optical filter for selecting only light in a desired wavelength region are arranged between the collector lens and the projection optical system. By doing so, even in the deep ultraviolet region that lens materials used are limited to fluorite and quartz, the arc lamp which has substantially high luminance and a small wavelength region can be projected on the pupil of the objective lens with a sufficient projection magnification, and aberrations from which the projection optical system suffers can be reduced. Furthermore, the optical filter is placed behind the nearly afocal lens system in which a light beam is narrowed, and thereby the entire optical system can be made compact.

The nearly afocal lens system is such that at least one of positive lenses constituting the lens unit with positive power is constructed of fluorite and at least one of negative lenses constituting the lens unit with negative power is constructed of quartz. Consequently, chromatic aberration produced by the nearly afocal lens system can be favorably corrected.

The nearly afocal lens system may be constructed with at least one lens unit with positive power, having a positive lens made of fluorite and a negative lens of quartz which are cemented or are in optical contact, and a lens unit with negative power. By this configuration, chromatic aberration produced by the nearly afocal lens system can be more favorably corrected.

The nearly afocal lens system can be removed from, or inserted into, the optical path in accordance with the replacement of a light source or applications to change the magnification where the image of the light source is projected on or close to the pupil of the objective lens and the solid angle of a light beam which can be brought to the collector lens from the lamp (namely, a numerical aperture on the lamp side). In this way, the brightness of the illumination optical system can be varied in accordance with observation techniques and the transmittances of specimens.

The reflecting illumination optical system also includes a light source, a collector lens for practically collimating a light beam emitted from the light source, a dichroic mirror for reflecting desired deep ultraviolet light from a practically collimated beam and transmitting light extending from the near-ultraviolet region to the near-infrared region, a first illumination optical system which uses a light beam reflected by the dichroic mirror to make observations through an objective lens for ultraviolet light, and a second illumination optical system which uses a light beam transmitted through the dichroic mirror to make observations through an objective lens for visible light. Consequently, light with wavelengths which have never been used is effectively utilized, and the production of ghost or flare light can be suppressed.

Second Embodiment

Figure 10:
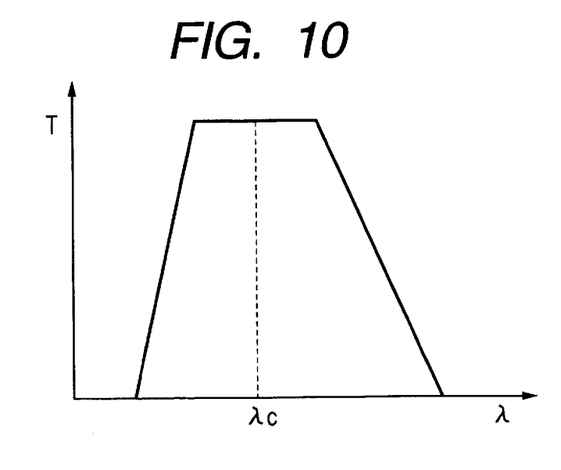
FIG. 10 is a diagram showing the spectral transmittance characteristic curve of an optical filter of a second embodiment in the present invention.

This embodiment refers to a BPF characterized in that its spectral transmittance characteristic curve is asymmetrical. The transmittance characteristic curve is shown in FIG. 10. The abscissas are wavelengths $\lambda$ and the ordinates are transmittances T. The curve rises steeply from the bottom toward the peak on the short-wavelength side, and the wavelength slope width between them is less than 10 nm. On the long-wavelength side, however, the downward slope of the characteristic curve is gentle and reaches the bottom beyond a wavelength slope width of 20 nm. The simplest technique of bringing about a rapid change of transmittance of the BPF is that light is transmitted through or reflected by a film of the same characteristic, for example, a short-wavelength cutoff characteristic, over and over again. This is because, in accordance with the number of times of this operation, the transmittance characteristic is rapidly changed in proportion to the square if the operation is repeated twice or the third power if it is repeated three times. In this case, however, as the change of transmittance is made rapid, the number of times of the operation must be increased that light is transmitted through or reflected by the film. Since the whole transmittance or reflectance is lowered each time the operation is performed, it is desirable that when there is a wavelength band such that the transmittance need not be rapidly changed, the characteristic curve is made asymmetrical to improve the entire efficiency.

Third Embodiment

Figure 11:
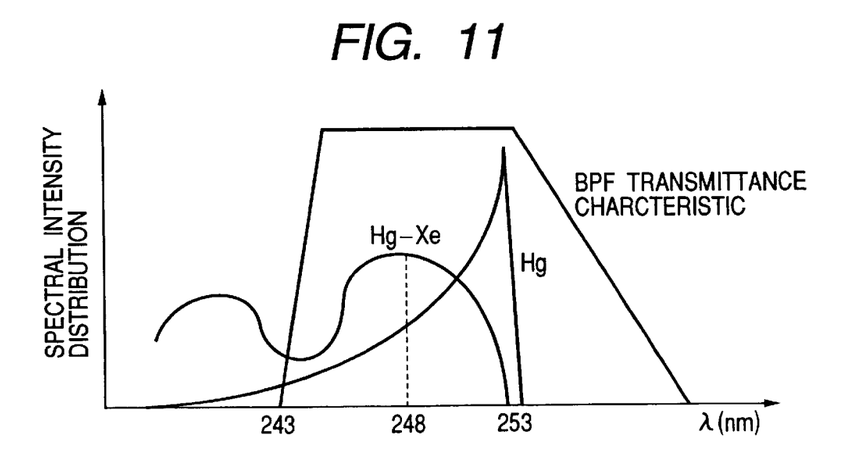
FIG. 11 is a diagram showing the spectral transmittance characteristic curve of an optical filter of a third embodiment in the present invention.

This embodiment refers to a BPF for deriving light with wavelengths of 248±5 nm from either the extra-high pressure mercury-vapor lamp or the extra-high pressure mercury-vapor xenon lamp. FIG. 11 shows its transmittance characteristic, together with the spectral intensity distributions of the respective lamps.

Although the extra-high pressure mercury-vapor lamp (labeled Hg in FIG. 11) and the extra-high pressure mercury-vapor xenon lamp (labeled Hg—Xe in FIG. 11) are somewhat different in spectral intensity distribution, each of them does not radiate light with a wavelength of 254 nm due to the self-absorption of mercury and radiates little light with respect to wavelengths up to about 270 nm.

Consequently, on the short-wavelength side, it is necessary to steeply raise the curve, but on the long-wavelength side, there is no need to do so, and if the curve falls gently toward the bottom, up to nearly 270 nm, a satisfactory result will be obtained. Hence, even though the BPF has an asymmetrical characteristic curve as in the third embodiment, only a desired wavelength region can be obtained with sufficient brightness.

In particular, since in the deep ultraviolet region the film material used for the BPF is highly limited in kind, it is very difficult to steepen the curve on both the short-wavelength side and the long-wavelength side. In contrast to this, the BPF of the third embodiment, in which the slope on the long-wavelength side is made gentle in accordance with the spectral intensity distribution characteristic due to the self-absorption of the lamp, has the advantage of being easy in design and fabrication. In addition, it is very effective for the construction of an illumination optical system in which light in a desired wavelength region is obtained at high efficiency as a whole.

Fourth Embodiment

Figure 12:
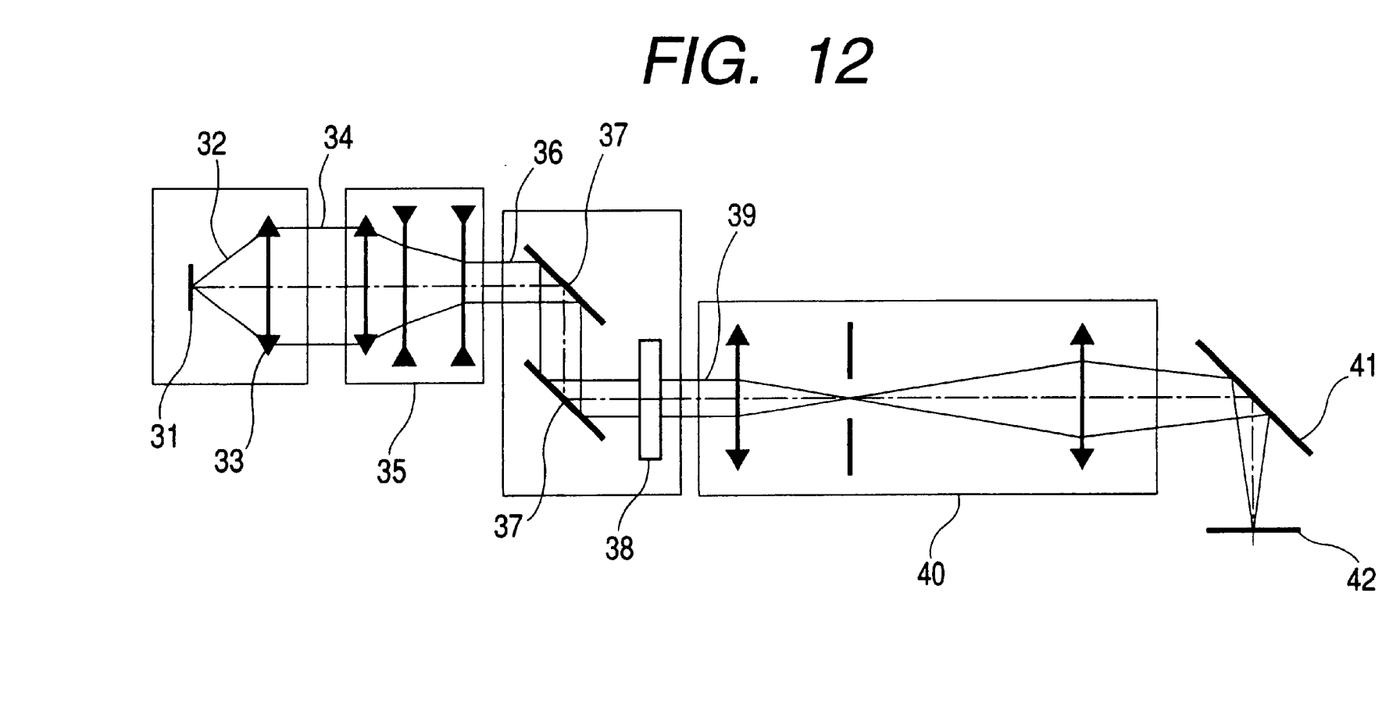
FIG. 12 is a view showing the construction of a microscope reflecting illumination optical system of a fourth embodiment in the present invention.

FIG. 12 shows the construction of a microscope reflecting illumination optical system of the fourth embodiment in the present invention. A light beam 32 emitted from an extra-high pressure mercury-vapor xenon lamp 31 is converted to a practically collimated beam 34 by a collector lens 33. The practically collimated beam 34 is further converted to a finer, practically collimated beam 36 by a nearly afocal lens system 35. Here, the nearly afocal lens system 35 includes a positive lens of fluorite, a negative lens of quartz, and a negative lens of quartz. The finer, practically collimated beam 36, after being twice-reflected by dichroic mirrors 37 having long-wavelength cutoff characteristics, is transmitted through a filter 38 having a short-wavelength cutoff characteristic and is changed to a light beam 39 substantially lying only in the region of wavelengths of 248±5 nm. This light beam travels through a projection lens system 40 and a half mirror 41, and the arc image of the lamp 31 is projected at or close to a pupil position 42 of an objective lens, not shown.

The reason why the nearly afocal lens system 35 is constructed as in the fourth embodiment is that aberrations including chromatic aberration can be favorably corrected in the 248±5 nm wavelength region. As mentioned above, the arc lamp has truly high luminance only in a very small region and thus, in order to obtain bright illumination, it is necessary to materially increase the projection magnification of the arc. With a simple arrangement, for example, a paraxial layout, the illumination system becomes very long and it is difficult to mount the illumination system in an actual microscope. Hence, the entire length of the this system is kept to a minimum by a telephoto system resulting from the arrangement of the positive and negative lenses, and at the same time, the projection magnification is increased. It is needless to say that fluorite is used for the positive lens and quartz is used for the negative lenses in order to suppress the production of chromatic aberration.

Light in a desired wavelength region is obtained by two reflections of light from the dichroic mirrors 37 and transmission of light through the filter 38, that is, these three optical elements constitute the BPF. Therefore, in order to avoid oversizing of this corresponding portion, the light beam is converted to the finer, practically collimated beam 36 by the nearly afocal lens system 35, and then the BPF is disposed. The transmittance characteristic of the BPF is as shown in FIG. 11, and the two reflections of light from the dichroic mirrors 37 are satisfactory because the slope need not be very steep on the long-wavelength side. In order to make the characteristic curve of the BPF symmetrical, that is, steepen the slope on the long-wavelength side to the same extent as that on the short-wavelength side, without considering the characteristic of the lamp 1, the light beam must be reflected three times by the dichroic mirrors 37. This brings about problems such as impairment of the entire efficiency and complication of the layout.

Fifth Embodiment

Figure 13:
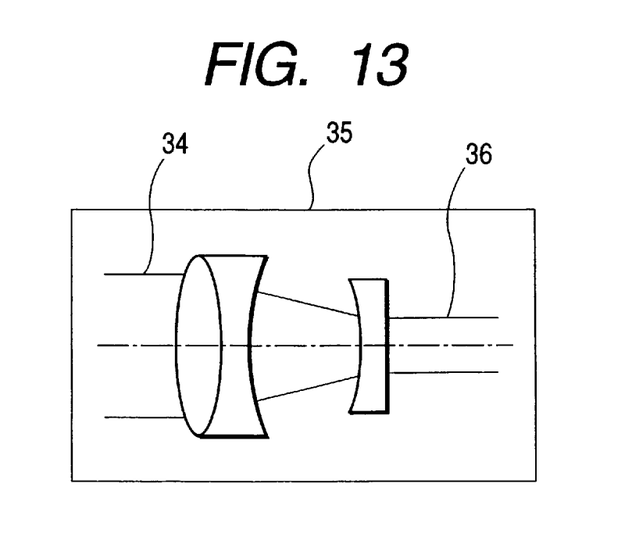
FIG. 13 is a view showing the construction of a microscope reflecting illumination optical system of a fifth embodiment in the present invention.

FIG. 13 shows the construction of a microscope reflecting illumination optical system of the fifth embodiment in the present invention. This figure illustrates more specifically the nearly afocal lens system 35 in the fourth embodiment, and thus parts other than corresponding ones are not shown here. The nearly afocal lens system 35 is a telephoto system including two lens units with three lens components, constructed with a cemented lens combining a positive lens made of fluorite and a negative lens of quartz, and a negative lens of quartz. This configuration, as described in the fourth embodiment, is such that the projection magnification of the arc is increased, and at the same time, aberrations including chromatic aberration are favorably corrected and the entire length is reduced to become compact. The use of the cemented lens leads to more favorable correction for chromatic aberration.

In the fifth embodiment, the cemented lens is used, but instead of this, lenses in optical contact may, of course, be used.

Sixth Embodiment

Figure 14:
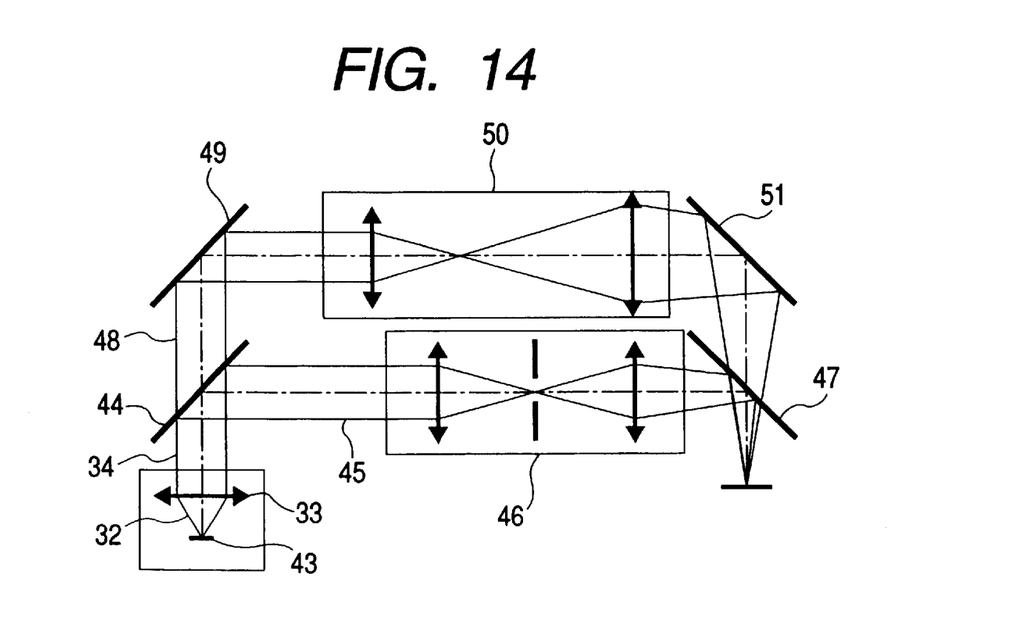
FIG. 14 is a view showing the construction of a microscope reflecting illumination optical system of a sixth embodiment in the present invention.

FIG. 14 shows the construction of a microscope reflecting illumination optical system of the sixth embodiment in the present invention. The light beam 32 emitted from an arc lamp 43 is converted to the practically collimated beam 34 by the collector lens 33. The practically collimated beam 34 is split into two beams by a dichroic mirror 44 which reflects light in the deep ultraviolet region and transmits light ranging from the near-ultraviolet region to the near-infrared region.

A deep ultraviolet beam 45 passes through a projection optical system 46 and is reflected by a dichroic mirror 47 having characteristics of reflecting light in the deep ultraviolet region and transmitting light ranging from the near-ultraviolet region to the near-infrared region to enter an objective lens for deep ultraviolet light, not shown. On the other hand, a light beam 48 transmitted through the dichroic mirror 44 is reflected by a mirror 49 and travels through a projection optical system 50, followed by a mirror 51 and the dichroic mirror 47, to enter an objective lens for visual light, not shown.

Consequently, light in a wavelength region which has never been used as unwanted light in the conventional ultraviolet microscope can be effectively utilized, and a single lamp house is satisfactory. Although, in the past, light transmitted through the dichroic mirror 44 has been scattered in a mirror body and this scattering has been responsible for flare and ghost, such an unfavorable phenomenon is eliminated by the present invention and good observations can be carried out.

It is needless to say that the above embodiments are not limited to the aspects of the present invention so far discussed and can be constructed in various combinations.

What is claimed is:

1. An illumination optical system comprising:

a light source;

a collector lens that practically collimates a light beam emitted from said light source;

a dichroic mirror that reflects desired deep ultraviolet light and transmits light extending from a near-ultraviolet region to a near-infrared region out of the light beam practically collimated by said collector lens, to resultantly split the light beam emitted from said light source into two light beams, to thereby allow the deep ultraviolet light to enter an objective lens for deep ultraviolet light and the light extending from the near-ultraviolet region to the near-infrared region to enter an objective lens for visible light;

a first illumination optical system that is disposed, in a light beam reflected by said dichroic mirror, between said dichroic mirror and the objective lens for deep ultraviolet light, to introduce the ultraviolet light into the objective lens for deep ultraviolet light; and a second illumination optical system that is disposed, in a light beam transmitted through said dichroic mirror, between said dichroic mirror and the objective lens for visible light, to introduce the light extending from the near-ultraviolet region to the near-infrared region into the objective lens for visible light.

\* \* \* \* \*